Aug. 10, 1965   M. M. ARNOULD ETAL   3,199,390
PLASTIC CUTTING MACHINE HAVING ENDLESS CONVEYING
MEANS TO CARRY A DIE CUTTING ASSEMBLY
BETWEEN PRESSURE ROLLERS
Filed Sept. 30, 1963   6 Sheets-Sheet 5

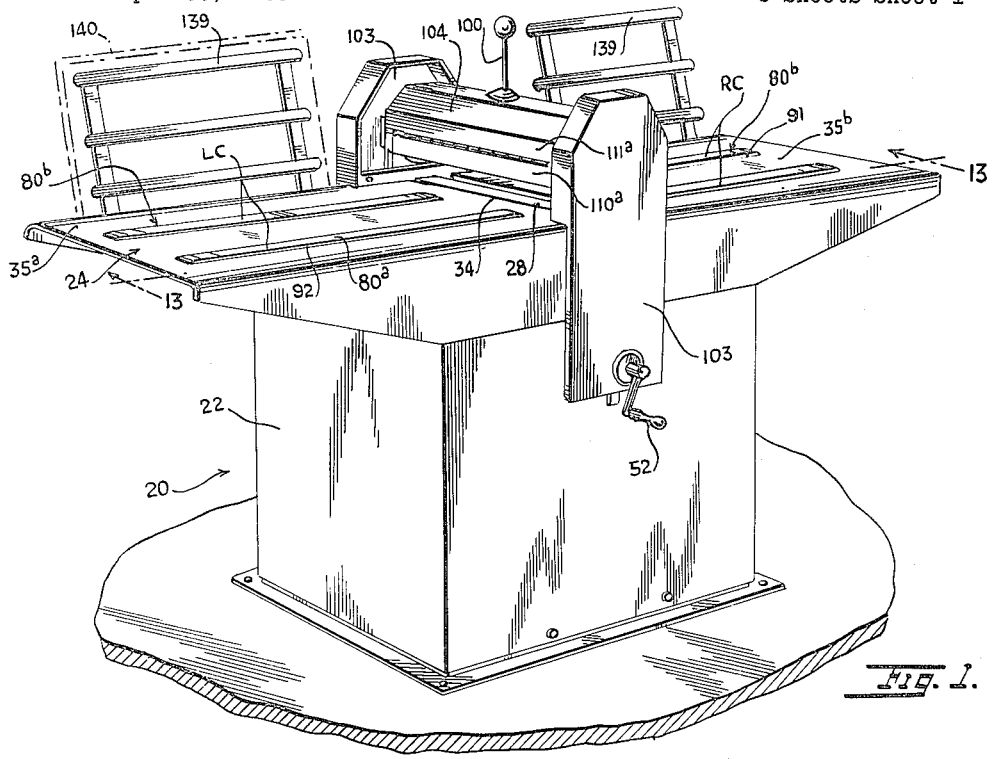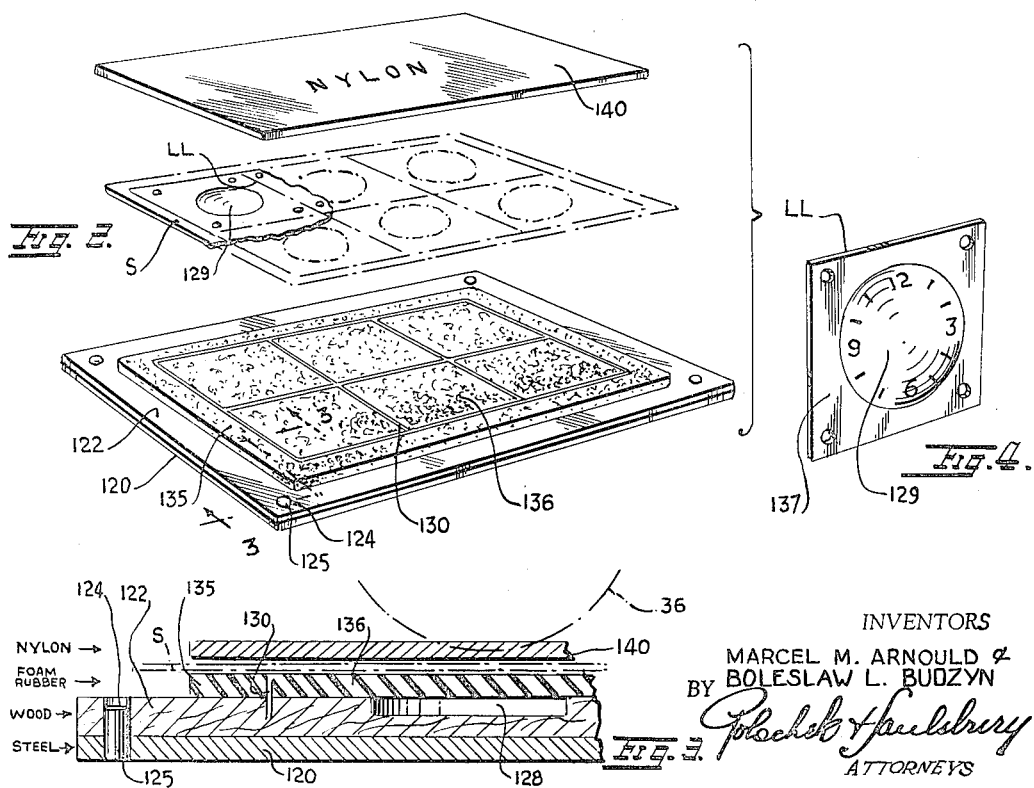

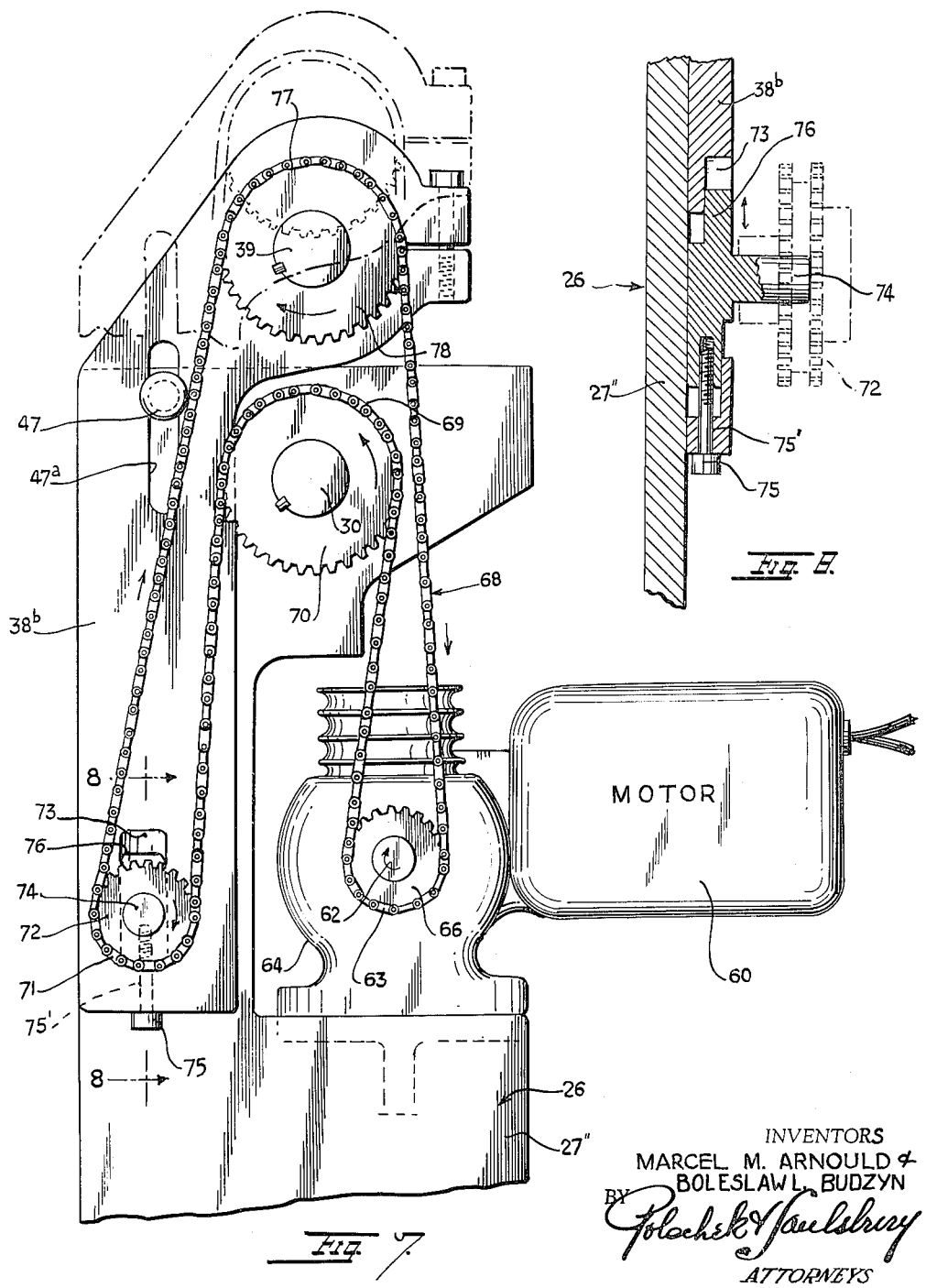

INVENTORS
MARCEL M. ARNOULD &
BOLESLAW L. BUDZYN
BY Polachek & Saulsbury
ATTORNEYS

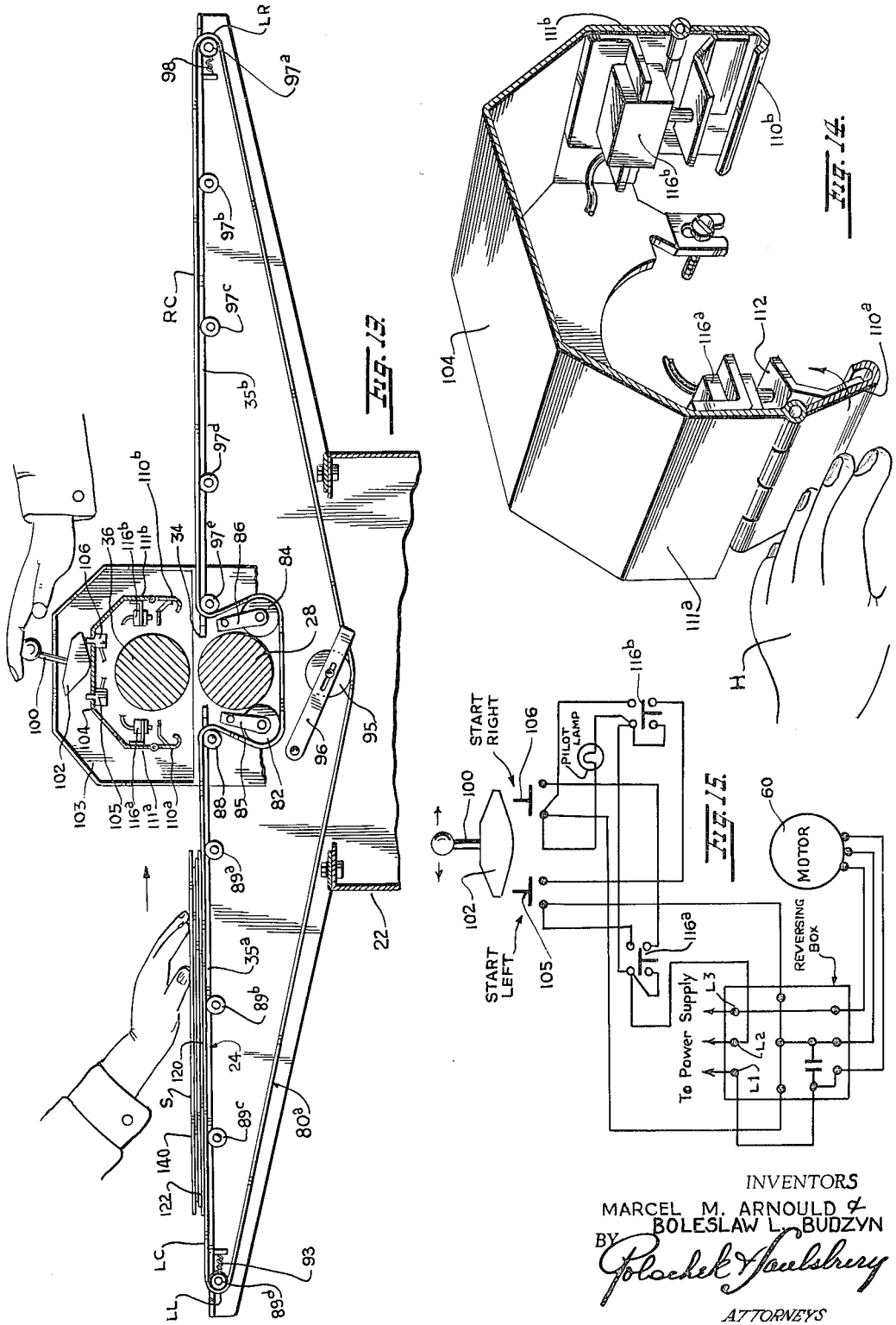

United States Patent Office 3,199,390
Patented Aug. 10, 1965

3,199,390
PLASTIC CUTTING MACHINE HAVING ENDLESS CONVEYING MEANS TO CARRY A DIE CUTTING ASSEMBLY BETWEEN PRESSURE ROLLERS
Marcel M. Arnould, East Orange, and Boleslaw L. Budzyn, Passaic, N.J., assignors to Plast-O-Craft Inc., Newark, N.J.
Filed Sept. 30, 1963, Ser. No. 312,627
5 Claims. (Cl. 83—284)

This invention concerns a sheet plastic cutting machine.

According to the invention there is provided a machine having a table on which may be placed an assembly of die cutting blades and one or more sheets to be cut into pieces. If more than one sheet is to be cut, the several sheets are piled in a stack on the die cutting blades for instant and simultaneous cutting of all sheets. The table is provided with continously moving belts which carry the assembly to spaced pressure rollers in the machine and away from the pressure rollers. The pressure rollers are arranged so that the spacing between them can be adjusted easily. The pressure rollers have a chain drive which accommodates automatically to the spacing of the rollers. The machine has a reversible motor driving the chain with an easily accessible control handle for changing direction of the motor drive and consequently the direction of movement of the chain drive. The endless belts are driven by one of the pressure rollers so that movement of the pressure rollers is coordinated with the endless belts. The machine is further provided with safety means for reversing automatically the direction of drive of the motor and movements of the chain drive and endless belts if an operator's hand approaches too closely to the pressure rollers. The die assembly can readily be changed for cutting out different patterns. The die assembly is adapted for cutting preformed plates having projections, indentations or concavities, etc.

It is therefore one object of the invention to provide a sheet cutting machine in which spaced pressure rollers are driven by an endless chain drive, and the rollers are provided with a crank operated worm and worm wheel mechanism for changing spacing of the rollers.

Another object is to provide a sheet cutting machine in which endless belts operatively driven by pressure rollers carry a die cutting assembly between the pressure rollers over sections of a horizontal table.

A further object is to provide a sheet cutting machine in which chain driven spaced pressure rollers are driven by a reversible motor means and in which safety plates are disposed on opposite sides of the rollers for reversing direction of drive of the motor means and rollers when an operator's hand approaches too close to the rollers.

Still another object is to provide a sheet cutting machine having spaced pressure rollers, with a quick adjustable means for setting spacing of the rollers.

Another object is to provide a novel die cutting assembly for cutting sheets in a sheet cutting machine.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a machine embodying the invention.

FIG. 2 is an exploded perspective view of a die cutting assembly, a plastic sheet to be cut thereby, part of the plastic sheet being broken away.

FIG. 3 is a fragmentary sectional view on an enlarged scale, taken on line 3—3 of FIG. 2 through the die cutting assembly and plastic sheet.

FIG. 4 is a perspective view of a single plastic member cut from a plastic sheet.

FIG. 7 is an end elevational view taken on line 7—7 of FIG. 6.

FIG. 8 is a sectional view on an enlarged scale taken on line 8—8 of FIG. 7.

Figure 6:
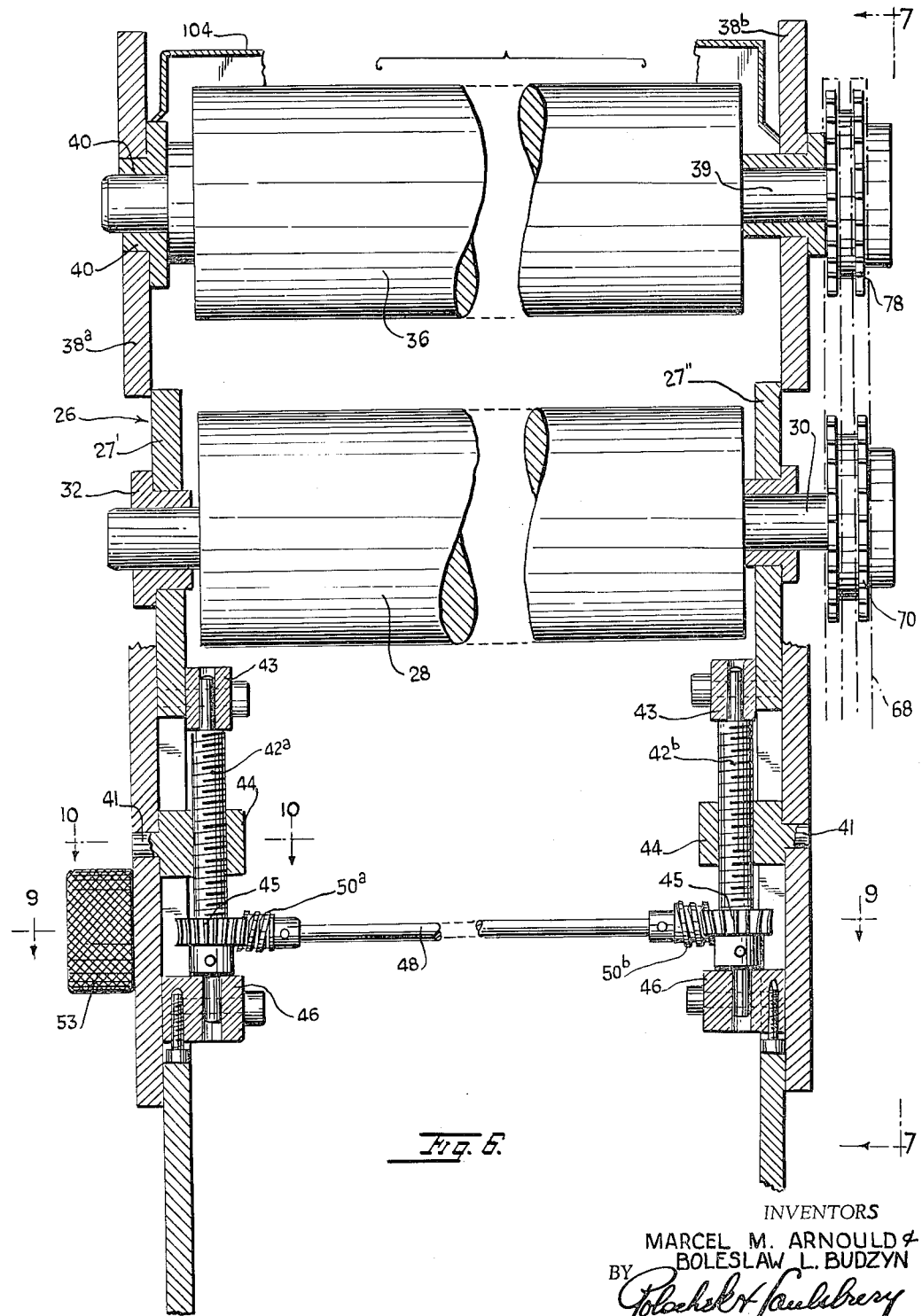
FIG. 6 is a sectional view on a further enlarged scale taken on line 6—6 of FIG. 5, parts being browen away.
Figure 9:
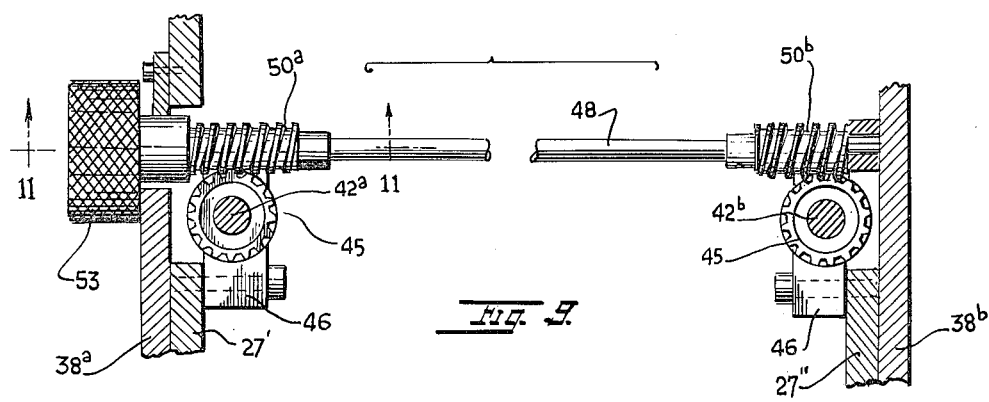
Figures 10, 11:
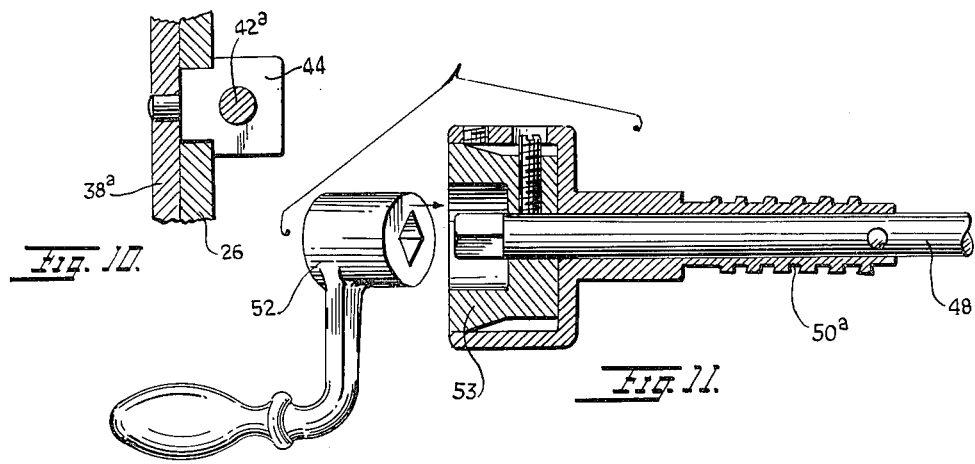

FIGS. 9 and 10 are sectional views taken on lines 9—9 and 10—10, respectively, of FIG. 6.

FIG. 11 is a sectional view on an enlarged scale taken on line 11—11 of FIG. 9, with an associated crank shown in a perspective view.

Figure 12:
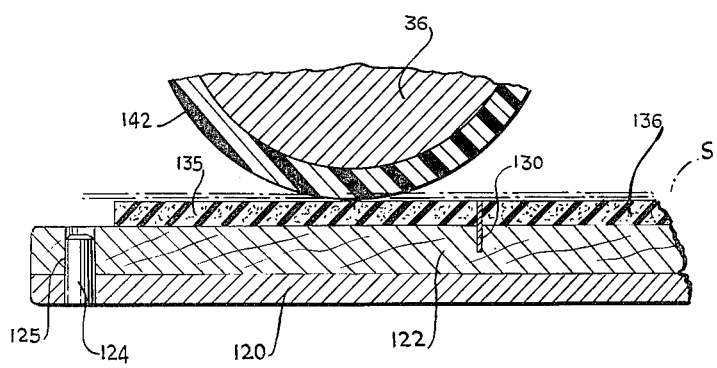

FIG. 12 is a fragmentary sectional view similar to FIG. 3, showing a modification of the machine structure.

FIG. 13 is a fragmentary vertical sectional view on an enlarged scale taken on line 13—13 of FIG. 1, showing internal parts and illustrating a mode of operation of the machine.

FIG. 14 is a perspective view of a safety assembly employed on the machine.

FIG. 15 is a diagram of an electrical circuit employed in the machine.

Figure 5:
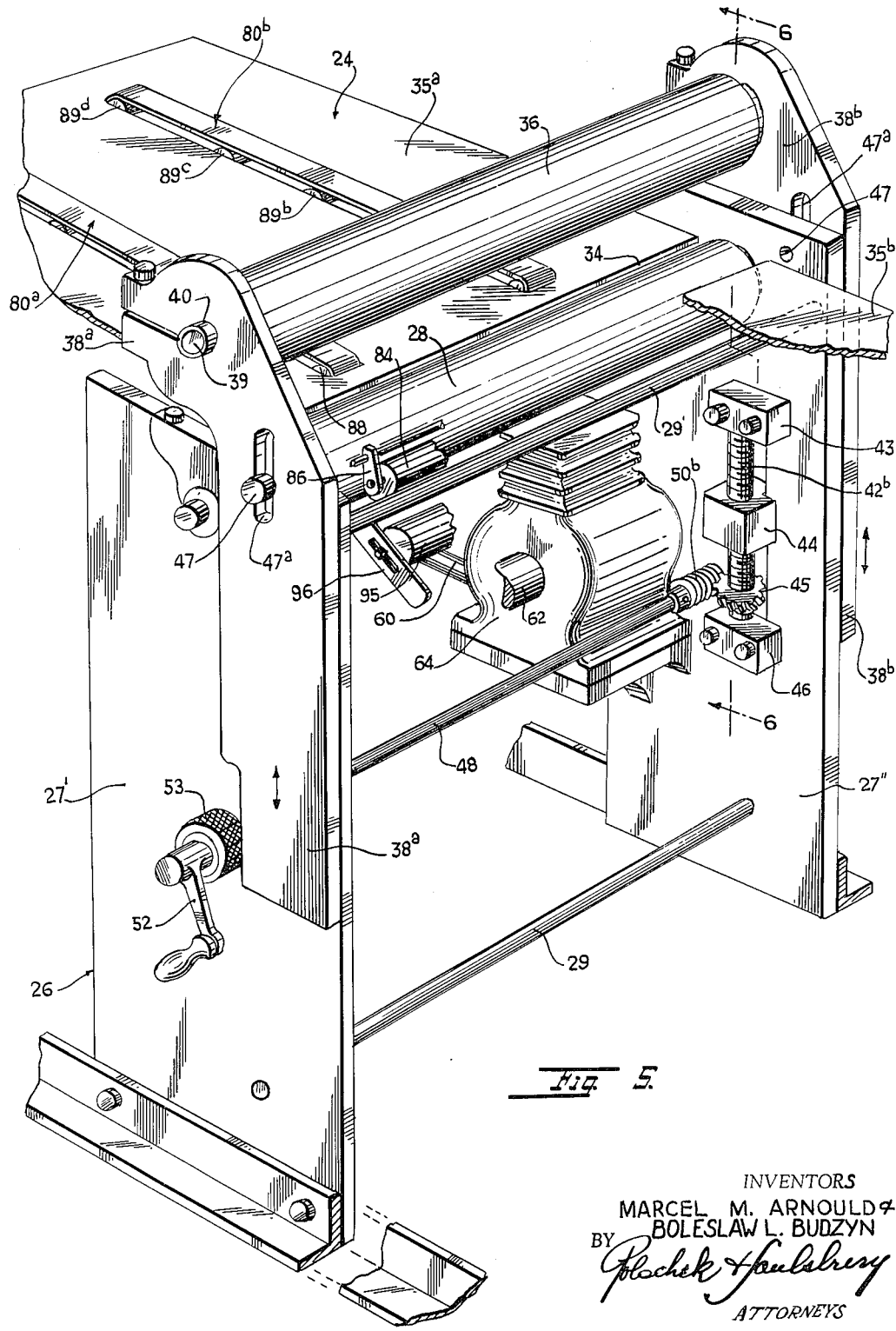
FIG. 5 is a perspective view on an enlarged scale showing internal construction of the machine, parts being broken away.

Referring first to FIG. 1, there is shown the machine 20 including a rectangular cabinet base 22 carrying a horizontal table 24 which extends outwardly of opposite sides of the cabinet base. Inside the base 22 is a frame 26 having two spaced parallel plates 27', 27" jointed by rods 29, 29' as shown in FIG. 5. A first axially horizontal drive roller 28 is rotatably carried by a shaft 30 engaged in bearings 32 at opposite sides of the frame. This roller projects upwardly out of a slot or gap 34 provided between sections 35$^a$, 35$^b$ of table 24. The axis of this roller is fixed in elevation with respect to the table.

A second axially horizontal drive roller 36 is carried by two vertical plates 38$^a$, 38$^b$ at opposite sides of frame 26. This roller has shaft 39 engaged in bearings 40 in the plates as best shown in FIG. 6. Roller 36 is mounted directly above roller 28 and can be adjusted in elevation or spacing with respect to roller 28.

A pair of axially vertical screws 42$^a$, 42$^b$ have their upper ends rotatably engaged in sleeves 43 secured to inner sides of frame 26. The screws extend through nuts 44 secured to plates 38$^a$, 38$^b$ by pins 41. Worm gears 45 are located at the lower ends of screws 42$^a$, 42$^b$, and bottom ends of the screws rotatably engaged in bearings 46 secured to inner sides of the frame 26. A horizontal shaft 48 carrying spaced worms 50$^a$, 50$^b$ passes through opposite sides of the frame 26. The worms are engaged with the worm gears 45 respectively.

A crank 52 can be engaged on one end of shaft 48 in hub 53 as best shown in FIGS. 5, 9 and 11, for turning the shaft. When the shaft is turned by the crank 52 the screws 42$^a$, 42$^b$ are turned via the worm gears 45 and the nuts 44 move vertically up or down depending on the direction of turning of the crank. Thus the plates 38$^a$, 38$^b$ and roller 36 are adjusted in elevation. Frame 26 has guide pins 47 engaged in slots 47$^a$ in plates 38$^a$, 38$^b$. Due to the worm and worm gear arrangement, the axis of roller 36 will remain fixed in position once it is set by turning of crank 52. The crank can be removed after the roller 36 is adjusted to a desired spacing from roller 28.

In order to drive the rollers 28, 36, there is provided a motor 60. This motor drives a shaft 62 through a gear train in gear box 64 on frame 26. Shaft 62 carries a sprocket 66 around which is entrained a first loop 63 of a chain 68. The chain, as best shown in FIG. 7, has a second loop 69 engaged over a sprocket 70 at one end of roller shaft 30, which extends beyond plate 38b. A third chain loop 71 is engaged around a sprocket 72 on stub shaft 74 carried by plate 38b. Shaft 74 is adjustably positioned in elevation on plate 38b by a screw 75 engaged with a small plate 76 movable in guide slot 73 and integral with shaft 74; see FIGS. 7 and 8. Chain 68 has a fourth loop 77 engaged on a sprocket 78 mounted on one end of roller shaft 39 at plate 38b.

It will thus be apparent that when roller 36 and plates 38a, 38b are adjusted up or down by turning of crank 52, the chain loops 71 and 77 move up or down correspondingly with respect to the loops 63 and 69 which are fixed in elevation. By these means, the chain traverse adjusts to the changing elevation of roller 36. Screw 75 can be turned in threaded hole 75' in plate 38b to adjust the tension in the chain between the sprocket 72 and roller sprockets 70, 78.

In order to move the die cutter assembly along the table 24, there is provided a pair of endless belts 80a, 80b; see FIGS. 1, 5 and 13. The belts are engaged under driven pulleys or rollers 82, 84 which are supported by brackets 85, 86 in contact with roller 28. Roller 28 serves as a drive roller to rotate rollers 82, 84. The belts extend upwardly and over idler roller 88 at table section 35a at the left side of the machine as shown in FIG. 13. The belts continue in straight courses LC over idler rollers 89a–89d which support the belts in exposed positions at slots 92 in the table section 35a. A spring or springs 93 maintain tension in the belts at the left loops LL of the belts. The belts continue from the left loops LL at left roller 89d downwardly to the right under tensioning roller 95 supported by pivotable arms 96. From roller 95 the belts extend around idler roller 97a at the right end of table section 35b. Spring or springs 98 tension the belt at the right loops LR as shown in FIG. 13. The belts then pass in straight courses RC over idler rollers 97b–97e and down around roller 84. The straight courses RC are exposed in slots 91 in right table section 35b. The belts will travel in one direction or another depending on the direction of rotation of the drive roller 28.

The direction of rotation of drive roller 28 is determined by the setting of a handle 100 attached to a rocker cam 102 inside of a hood 104 at the center of table 24. The handle can be pivoted to the right or left as viewed in FIGS. 1 and 13. Push-button switches 105, 106 are associated with the rocker cam as shown in both FIGS. 13 and 15. Motor 60 is of a conventional three-phase reversible type which rotates in one direction or another depending on whether switch 105 or 106 is closed. Power is supplied on three phase lines at power terminals L1–L3. When handle 100 is pushed to the right, the roller 28 will be turned clockwise as viewed in FIG. 13 and belts 80a, 80b will advance to the right over table sections 35a, 35b. If handle 100 is pushed to the left, roller 28 will be turned counterclockwise and the belts will advance to the left over the table sections. Roller 36 will at the same time rotate in a direction opposite to roller 28 due to the arrangement of the chain 68.

The machine is provided with a safety device, which includes a pair of depending plates 110a, 110b hinged to right and left walls 111a, 111b, respectively, of hood 104 which is supported on end plates 103. The hinged plates have inwardly extending sections 112 which serve to actuate push-button switches 116a, 116b, respectively. These switches are in circuit with switches 105, 106 in such a manner that manually pushing plate 110a inwardly to the right as indicated in FIG. 14 is equivalent to turning handle 100 to the left so that the belts 80a, 80b move to the left on table 24. Conversely, pushing plate 110b inwardly to the left is equivalent to turning handle 100 to the right so that the belts move to the right on table 24. As a result, whenever an operator's hand H approaches too closely to rollers 28, 36, safety plate 110a or 110b is manually pivoted inwardly and the direction of belt travel reverses automatically to prevent the belts from carrying the operator's hand into the hood 104 and between the rollers 28, 36.

FIGS. 2 and 3 show a die assembly which includes a rigid base or backing plate 120 made of steel or other strong material. On plate 120 is a die plate 122 made of wood or plastic. This plate has locating holes 124 engaged by pins 125 extending up from plate 120. Set into the plate 122 and extending upwardly therefrom are sharp cutting blades 130. These blades are shown arranged in a grid pattern in FIG. 2 so as to cut as many as six rectangular members from a plastic sheet S in a single pass of the assembly through the machine. Recesses 128 may be provided in base plate 122 to receive convex projections 129 of preformed sheet S, if the sheet is one which is to be divided up into rectangular members such as clock-face members 137 shown in FIG. 4.

Surrounding the blades 130 is a resilient sponge rubber or plastic frame 135 and within each rectangular array of blades is a rectangular block 136 also made of sponge rubber or plastic. The frame 135 and blocks 136 serve as pads to support sheet S while it is being cut on lines LL into several parts. A tough resilient plastic sheet 140 made of nylon or other plastic is provided as an overlay for the sheet S to apply uniform pressure thereon while passing through the machine.

To operate the machine, the motor 60 is turned on an assembly of die plates 120, 122, sheet S and overlay sheet 140 is placed on straight belt courses LC or RC on table section 35a or 35b. If the cutting is to be done by movement of the assembly from left to right, then the assembly is placed on belt courses LC and handle 100 is moved to the right. The belts 80a, 80b will carry the assembly across the table under hood plates 110a, 110b and between rollers 28, 36. The pressure exerted between these rollers will force the sheet S down on the sharp edges of the blades to cut the several members 137. If desired, a stack of sheets S can be placed on the die cutting assembly and sheet 140 will be placed over the stack. The die cutting assembly can be arranged to cut a stack of sheets several inches thick. Crank 52 will be used to adjust the spacing of the rollers 28, 36 to accommodate the machine to the thickness of the stack being cut. Frames 139 are provided at one side of table 24 to support sheet 140 when not in use.

If desired, the overlay sheet 140 may be omitted and instead, upper roller 36 can be covered with a tough, resilient plastic sleeve or cover 142 as shown in FIG. 12. Operation of the machine will be the same as described above with all the same drive, adjustment and safety features.

The invention makes it possible to cut sheets of any desired length in a single pass through the machine. Quick adjustment means is provided for accommodating the machine to any thickness of sheet or stack of sheets. Die cutters can be quickly changed since the assemblies are not secured to the machine in any way. Sheets to be cut can be passed through the machine in either direction. Safety features are operative with either direction of operation. The machine operates rapidly without damage to the members cut from sheets or stack of sheets. The machine accommodates either flat or preformed sheets. Members can be cut from the sheets in rectangular, round and other geometrical shapes, either regular or irregular in form depending on the arrangements of the cutter blades on the die plates. The machine can be operated and adjusted by unskilled labor and requires no complicated set-ups.

While we have illustrated and described the preferred embodiments of our invention, it is to be understood that we do not limit ourselves to the precise contruction herein disclosed and that various changes and modifications may be made within the scope of the invention as defined in the appended claims.

Having thus described our invention, what we claim as new, and desire to secure by United States Letters Patent is:

1. In a machine for cutting plastic sheets, a horizontal table having a pair of horizontally spaced sections, a first rotatable pressure roller disposed between the spaced sections of the table for movement thereover of an assembly of die cutting blades and at least one sheet to be cut by the blades, a second rotatable pressure roller, movable means supporting said second roller rotatably over the first roller in vertically spaced relationship, and means for adjusting said support means in elevation to adjust and set the vertical spacing between the first and second rollers, motor drive means, an endless chain operatively connecting said motor drive means and said rollers for continuously driving the rollers, an idler sprocket carried by said support means and movable therewith, said chain being entrained on said sprocket so that the chain remains operatively engaged with said rollers in all positions of adjustment of the spacing between the rollers, said sections of the table having longitudinally extending slots, endless belts having straight courses disposed in said slots and projecting outwardly thereof, and idler rollers carrying said endless belts, certain of said idler rollers being disposed in engagement with the first pressure roller so that the endless belts are driven continuously in coordination with rotation of the pressure rollers.

2. In a machine for cutting plastic sheets, a horizontal table having a pair of horizontally spaced sections, a first rotatable pressure roller disposed between the spaced sections of the table for movement thereover of an assembly of die cutting blades and at least one sheet to be cut by the blades, a second rotatable pressure roller, movable means supporting said second roller rotatably over the first roller in vertically spaced relationship, and manually operated means including interengaged worms and worm gears operatively connected to said support means for adjusting and setting the spacing between the first and second rollers, said sections of the table having longitudinally extending slots, endless belts having straight courses disposed in said slots and projecting outwardly thereof, and idler rollers carrying said endless belts, certain of said idler rollers being disposed in engagement with the first pressure roller so that the endless belts are driven continuously in coordination with rotation of the pressure rollers.

3. In a machine for cutting plastic sheets, a horizontal table having a pair of horizontally spaced sections, a first rotatable pressure roller disposed between the spaced sections of the table for movement thereover of an assembly of die cutting blades and at least one sheet to be cut by the blades, a second rotatable pressure roller, movable means supporting said second roller rotatably over the first roller in vertically spaced relationship, and means for adjusting said support means in elevation to adjust and set the vertical spacing between the first and second rollers, said sections of the table having longitudinally extending slots, endless belts having straight courses disposed in said slots and projecting outwardly thereof, and idler rollers carrying said endless belts, certain of said idler rollers being disposed in engagement with the first pressure roller so that the endless belts are driven continuously in coordination with rotation of the pressure rollers.

4. In a machine for cutting plastic sheets, a horizontal table having a pair of horizontally spaced sections, a first rotatable pressure roller disposed between the spaced sections of the table for movement thereover of an assembly of die cutting blades and at least one sheet to be cut by the blades, a second rotatable pressure roller, movable means supporting said second roller rotatably over the first roller in vertically spaced relationship, and means for adjusting said support means in elevation to adjust and set the vertical spacing between the first and second rollers, motor drive means, an endless chain operatively connecting said motor drive means and said rollers for continuously driving the rollers, an idler sprocket carried by said support means and movable therewith, said chain being entrained on said sprocket so that the chain remains operatively engaged with said rollers in all positions of adjustment of the spacing between the rollers, said sections of the table having longitudinally extending slots, endless belts having straight courses disposed in said slots and projecting outwardly thereof, idler rollers carrying said endless belts, certain of said idler rollers being disposed in engagement with the first pressure roller so that the endless belts are driven continuously in coordination with rotation of the pressure rollers, said motor drive means being reversible, a pair of hinged safety plates suspended over the table sections on opposite sides of the pressure rollers, and reversing switches in circuit with said motor drive means for reversing direction of rotation of said motor drive means and reversing direction of travel of said endless belts when either one of the plates is pivoted toward the pressure rollers to actuate one of the reversing switches.

5. In a machine for cutting plastic sheets, a horizontal table having a pair of horizontally spaced sections, a first rotatable pressure roller disposed between the spaced sections of the table for movement thereover of an assembly of die cutting blades and at least one sheet to be cut by the blades, a second rotatable pressure roller, movable means supporting said second roller rotatably over the first roller in vertically spaced relationship, and manually operated means including interengaged worms and worm gears operatively connected to said support means for adjusting and setting the spacing between the first and second rollers, motor drive means, an endless chain operatively connecting said motor drive means and said rollers for continuously driving the rollers, an idler sprocket carried by said support means and movable therewith, said chain being entrained on said sprocket so that the chain remains operatively engaged with said rollers in all positions of adjustment of the spacing between the rollers, said sections of the table having longitudinally extending slots, endless belts having straight courses disposed in said slots and projecting outwardly thereof, idler rollers carrying said endless belts, certain of said idler rollers being disposed in engagement with the first pressure roller so that the endless belts are driven continuously in coordination with rotation of the pressure rollers, said motor drive means being reversible, a pair of hinged safety plates suspended over the table sections on opposite sides of the pressure rollers, and reversing switches in circuit with said motor drive means for reversing direction of rotation of said motor drive means and reversing direction of travel of said endless belts when either one of the plates is pivoted toward the pressure rollers to actuate one of the reversing switches.

References Cited by the Examiner

UNITED STATES PATENTS

| | | | |
|---|---|---|---|
| 127,235 | 5/72 | Heywood | 83—155 |
| 1,824,163 | 9/31 | Maier | 83—155 X |
| 1,942,539 | 1/34 | Deubel | 83—684 |
| 1,996,176 | 4/35 | Smith | 83—509 |
| 2,121,004 | 6/38 | Balfe | 83—531 X |
| 2,141,574 | 12/38 | Wamser | 83—155 X |
| 2,165,394 | 7/39 | Lyness | 83—684 |
| 2,319,896 | 5/43 | Winkley | 83—284 |
| 2,338,982 | 1/44 | Tauser | 83—155 X |
| 2,366,331 | 1/45 | Harless | 101—227 |
| 2,428,430 | 10/47 | Mong | 83—509 |
| 2,776,510 | 1/57 | Klopfenstein | 100—168 X |
| 3,024,688 | 3/62 | Romm | 83—155 |
| 3,110,207 | 11/63 | Shuster | 83—512 X |

ANDREW R. JUHASZ, *Primary Examiner.*

WILLIAM W. DYER, JR., *Examiner.*